United States Patent
Johnson, Jr. et al.

(10) Patent No.: US 6,661,779 B2
(45) Date of Patent: *Dec. 9, 2003

(54) DIAL UP TELEPHONE CONFERENCING SYSTEM CONTROLLED BY AN ONLINE COMPUTER NETWORK

(75) Inventors: Clark E. Johnson, Jr., Minneapolis, MN (US); Richard J. Solomon, Monson, MA (US); Tice F. DeYoung, Fairfax, VA (US); David J. Farber, Landenberg, PA (US)

(73) Assignee: Caritas Technologies, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/087,671

(22) Filed: Mar. 1, 2002

(65) Prior Publication Data

US 2002/0131406 A1 Sep. 19, 2002

Related U.S. Application Data

(63) Continuation of application No. 09/819,079, filed on Apr. 30, 2001, now Pat. No. 6,480,074, which is a continuation of application No. 09/587,080, filed on Jun. 3, 2000, now Pat. No. 6,266,328, which is a continuation-in-part of application No. 09/212,786, filed on Dec. 16, 1998, now Pat. No. 6,072,780, which is a continuation-in-part of application No. 08/918,564, filed on Aug. 22, 1997, now abandoned.

(60) Provisional application No. 60/024,592, filed on Aug. 26, 1996.

(51) Int. Cl.⁷ .......................... H04L 12/16; H04Q 11/00
(52) U.S. Cl. ...................................................... 370/260
(58) Field of Search ................................ 370/259, 260, 370/261, 262–271, 410, 352–356; 379/201, 202, 203–206, 209, 210, 67, 88, 89, 196; 348/14, 15, 16; 455/414, 416

(56) References Cited

U.S. PATENT DOCUMENTS

| | | | |
|---|---|---|---|
| 4,866,758 A | 9/1989 | Heinzelmann | 379/94 |
| 4,872,160 A | 10/1989 | Hemmady et al. | 370/60 |
| 4,872,197 A | 10/1989 | Pemmaraju | 379/93 |
| 4,958,341 A | 9/1990 | Hemmady et al. | 370/60.1 |
| 5,247,571 A | 9/1993 | Kay et al. | 379/207 |

(List continued on next page.)

OTHER PUBLICATIONS

"New Technology Lets PCs Call Telephones" *Investor's Business Daily*, Oct. 25, 1995.

(List continued on next page.)

*Primary Examiner*—Ajit Patel
(74) *Attorney, Agent, or Firm*—Fulbright & Jaworski L.L.P.

(57) ABSTRACT

In a telephone conferencing system, a digital communication network such as the Internet is used to establish and control the telephone connections between multiple conferees with the telephone network being the means of exchanging verbal information. Each conferee may have a computer connected to the digital network, and each has an independent telephone instrument connected to the public switched telephone network. An in-charge conferee utilizes his computer containing appropriate software to initiate the conference and to control the participation of the conferees. The in-charge conferee sends digital control signals to a switch interface controlling a telephone switch as a gateway to the telephone network using SS7 control signals. These SS7 control signals include the commands by which the conferee telephones are rung up, brought on line, or dropped from the conference. The switch provides telephone status information back over the digital network, and the in-charge conferee, as well as other conferees provided with appropriate software, display this status information on their PC monitors.

45 Claims, 4 Drawing Sheets

U.S. PATENT DOCUMENTS

| | | | |
|---|---|---|---|
| 5,341,374 A | | 8/1994 | Lewen et al. ............... 370/85.4 |
| 5,375,068 A | | 12/1994 | Palmer et al. ............... 364/514 |
| 5,410,754 A | | 4/1995 | Klotzbach et al. ........ 370/85.13 |
| 5,434,913 A | | 7/1995 | Tung et al. ................. 379/202 |
| 5,475,732 A | | 12/1995 | Pester, III .................... 379/34 |
| 5,490,247 A | | 2/1996 | Tung et al. ................. 395/162 |
| 5,493,568 A | | 2/1996 | Sampat et al. ................ 370/60 |
| 5,559,875 A | * | 9/1996 | Bieselin et al. ........ 379/202.01 |
| 5,608,786 A | | 3/1997 | Gordon ...................... 379/100 |
| 5,619,555 A | * | 4/1997 | Fenton et al. ............... 379/196 |
| 5,629,978 A | * | 5/1997 | Blumhardt et al. .......... 348/552 |
| 5,661,790 A | * | 8/1997 | Hsu ....................... 379/209.01 |
| 5,712,907 A | | 1/1998 | Wegner et al. .............. 379/112 |
| 5,724,355 A | | 3/1998 | Bruno et al. ................. 370/401 |
| 5,726,984 A | | 3/1998 | Kubler et al. ................ 370/349 |
| 5,751,706 A | | 5/1998 | Land et al. .................. 370/352 |
| 5,765,108 A | * | 6/1998 | Martin et al. ............... 455/414 |
| 5,818,836 A | * | 10/1998 | DuVal ........................ 370/352 |
| 5,852,656 A | * | 12/1998 | Sato et al. ................... 370/260 |
| 5,870,565 A | | 2/1999 | Glitho ................... 395/200.79 |
| 5,883,891 A | | 3/1999 | Williams et al. ............ 370/356 |
| 5,884,032 A | * | 3/1999 | Bateman et al. ............ 370/356 |
| 5,898,839 A | | 4/1999 | Berteau ................. 395/200.57 |
| 5,912,887 A | | 6/1999 | Sehgal ........................ 370/354 |
| 5,917,817 A | | 6/1999 | Dunn et al. ................. 370/352 |
| 5,923,659 A | | 7/1999 | Curry et al. ................ 370/401 |
| 5,940,479 A | | 8/1999 | Guy et al. ................ 379/93.01 |
| 5,987,102 A | | 11/1999 | Elliott et al. ............. 379/93.17 |
| 6,009,469 A | | 12/1999 | Mattaway et al. ........... 709/227 |
| 6,026,087 A | | 2/2000 | Mirashrafi et al. .......... 370/389 |
| 6,031,836 A | | 2/2000 | Haserodt .................... 370/389 |
| 6,035,214 A | | 3/2000 | Henderson .................. 455/556 |
| 6,069,890 A | * | 5/2000 | White et al. ................ 370/352 |
| 6,075,783 A | | 6/2000 | Voit ............................ 370/352 |
| 6,075,796 A | | 6/2000 | Katseff et al. ............... 370/466 |
| 6,078,579 A | | 6/2000 | Weingarten .................. 370/352 |
| 6,084,956 A | | 7/2000 | Turner et al. ................ 379/230 |
| 6,097,804 A | | 8/2000 | Gilbert et al. ............... 379/230 |
| 6,101,182 A | | 8/2000 | Sistanizadeh et al. ........ 370/352 |
| 6,101,246 A | | 8/2000 | Heinmiller et al. ......... 379/142 |
| 6,125,113 A | * | 9/2000 | Farris et al. ................. 370/352 |
| 6,128,285 A | | 10/2000 | Buhler et al. ................ 370/242 |
| 6,178,181 B1 | | 1/2001 | Glitho ......................... 370/467 |
| 6,185,204 B1 | | 2/2001 | Voit ............................ 370/352 |
| 6,195,425 B1 | | 2/2001 | Farris ......................... 379/230 |
| 6,198,738 B1 | | 3/2001 | Chang et al. ................ 370/352 |
| 6,243,373 B1 | | 6/2001 | Turock ........................ 370/352 |
| 6,278,707 B1 | | 8/2001 | Macmillan et al. .......... 370/352 |
| 6,285,745 B1 | | 9/2001 | Bartholomew et al. .. 379/88.17 |
| 6,324,183 B1 | | 11/2001 | Miller et al. ................. 370/467 |
| 6,337,858 B1 | | 1/2002 | Petty et al. .................. 370/356 |
| 6,442,169 B1 | | 8/2002 | Lewis ......................... 370/401 |
| 6,445,694 B1 | | 9/2002 | Swartz ........................ 370/352 |
| 6,452,925 B1 | | 9/2002 | Sistanizadeh et al. ........ 370/352 |
| 6,453,034 B1 | | 9/2002 | Donovan et al. ....... 379/220.01 |

OTHER PUBLICATIONS

"Emerging Technology Review, vol. 1" *Salomon Smith Barney*, Dec. 11, 2001.

"IP Telephony" by Walter J. Goralski & Matthew C. Kolon, *McGraw Hill*, 2000.

"TCP/IP for Dummies," 4$^{th}$ Edition, by C. Leiden and M. Wilensky, IBM, 2000.

"Encyclopedia of Networking & Telecommunications," by Tom Sheldon, *McGraw Hill*, 2001.

"Cisco Router Handbook," by George C. Sackett, *McGraw Hill*, 2000.

* cited by examiner

DIAL UP TELEPHONE CONFERENCING SYSTEM CONTROLLED BY AN ONLINE COMPUTER NETWORK

RELATED APPLICATIONS

This application is a continuation of application Ser. No. 09/819,079, filed Apr. 30, 2001, now U.S. Pat. No. 6,480,474 which was a continuation of application Ser. No. 09/587,080, filed Jun. 3, 2000, and now U.S. Pat. No. 6,266,328, which was a continuation-in-part of application Ser. No. 09/212,786, filed Dec. 16, 1998, and now U.S. Pat. No. 6,072,780, which was a continuation-in-part of application Ser. No. 08/918,564, filed Aug. 22, 1997, now abandoned which claimed the benefit of priority pursuant to 35 U.S.C. §119 of Provisional Application No. 60/024,592, filed Aug. 26, 1996.

BACKGROUND OF THE INVENTION

1. Field of the Invention

This invention relates to telephone conferencing, and in particular to dial up telephone conferencing utilizing computer control.

2. Description Relative to the Prior Art

In the art, it is known that telephone conferences may be implemented through "conferencing centers" provided as a service by local and long distance telephone companies. A list of telephone numbers of the conferees and the date and time at which the conference is to begin is supplied to a conference center operator who performs the dialing operations to bring the conferees simultaneously on line to initiate the conference. This technique is limited by the necessity of setting up a relatively inflexible forum in which all participants must be designated in advance, and the inclusion and reliance upon outside telephone company personnel to implement the conference.

A more recent form of conferencing utilizes digital networks such as the Internet that are publicly accessible by individual computers (typically PCs) via Internet Relay Chat (IRC) hosts. The conferees come on line and are interconnected by means of the host, and may utilize software which allows fully duplexed communication between the PCs. Typically, the conference is conducted with the exchanged information visually appearing on the individual PC display screens. In more sophisticated applications allowing audio communication between the conferees, additional hardware is required at each PC site. A microphone and analog to digital converter provide digitized audio input to a PC by means of appropriate software, such as commercially available VocalTec software, and the audio output is derived from the digital information transmitted over the Internet by use of a digital to analog converter feeding a speaker. Encryption software may be employed to "scramble" the digital information transmitted via the network, but all potential conferees must be provided with this software, and must be alerted to the fact that it is being used. Hence, a conference of multiple conferees requires additional hardware and software at each PC site in order to implement a conference by means of the Internet.

BRIEF DESCRIPTION OF THE DRAWINGS

The invention will be described with respect to the drawings, which.

DESCRIPTION OF THE PREFERRED EMBODIMENTS

Figure 1:
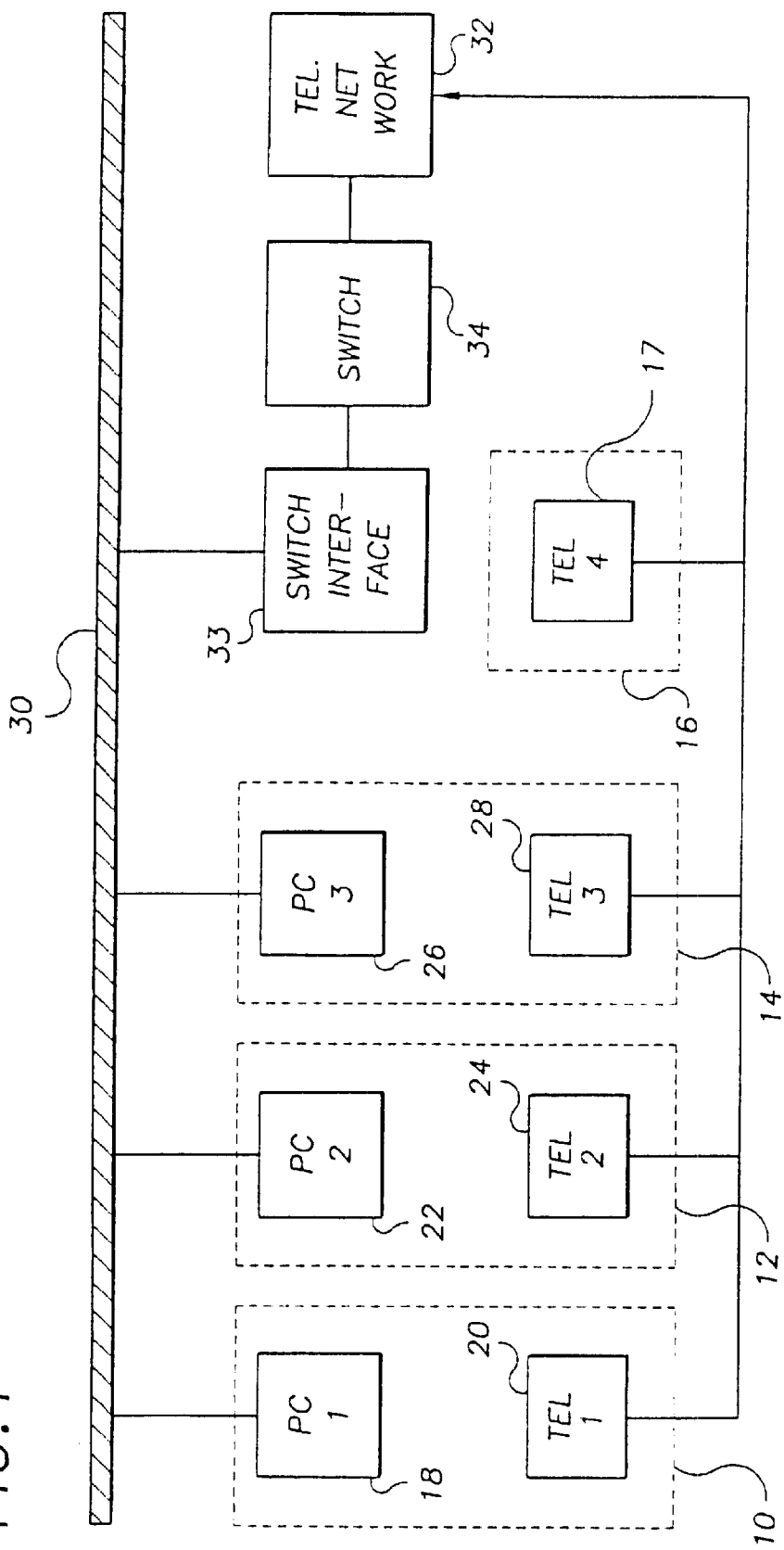
FIG. 1 is a block diagram of the system of the invention.

Referring to FIG. 1, a conferee station 10 consists of a PC computer 18 and a telephone 20. Conferee stations 12, 14, correspondingly have PC computers 22, 26 and telephones 24, 28. Other conferee stations, i.e. 16 may still be connected into the conference network without the requirement of a computer; the conferee station 16 comprising only the telephone 17. All the PCs are connected to the Internet network 30 using standard Transmission Control Protocol/Internet Protocol (TCP/IP) connect software. The telephones 20, 24, 28, 17 are tied into the telephone network 32 in a conventional manner. It will be noted that the telephones 20, 24, 28, 17 are independent of the Internet network 30. A switch interface 33 controlling a telephone switch 34 is also connected so as to receive control signals via the Internet 30 and to transmit them to the telephone network 32, as will be described below.

Anyone of the conferee stations 10, 12, 14, possessing a PC, may be designated as Conference Meister. For convenience of explanation, it is assumed that conferee station 14 is designated as Conference Meister. To implement this designation, PC 26 of conferee station 14 is provided with additional software which allows PC 26 to communicate with the switch interface 33 both to control the telephone switch 34 and to receive status information from the telephone switch 34, via the Internet 30.

The Conference Meister station 14 and the switch interface 33 communicate over the TCP/IP transport layer of the Internet 30 using the Internet's User Datagram Protocol (UDP) with checksum. A common fixed-length interprocess message called the Conference Protocol Data Unit (CDPU), using the software format further described below in Table I, is exchanged between the Conference Meister 14 and the switch interface 33, in the data field of a UDP-Datagram. The switch interface 33 converts the CDPU into Signalling System 7 (SS7) commands which act on the switch 34, and attendantly, on the telephone network 32 to control the conferees telephones 20, 24, 28, 17. SS7 is an internationally recognized telephony standard of 255 commands for controlling telephone calls via switch 34 using standard lookup table procedures. The switch interface 33 interacting with the switch 34 may be implemented incorporating a standard micro-computer such as a Motorola 68705P5 performing the table lookup translation of SS7 commands into CPDU commands stored in its ROM memory. It will be noted that the switch interface 33 is bi-directional, and telephone connection status information as established by the switch 34, i.e. ringing, off-hook, on-hook busy, for all participants is transmitted back via the Internet to the Conference Meister for icon display on his PC.

All fields in the CPDU are ASCII character fields. The CPDU consists of 32 bytes of data as follows:

Session ID——4 bytes
Conference ID——2 bytes
Command/Response Code——2 bytes
Data——24 bytes The Session ID and Conference ID fields contain administrative "housekeeping" information. The Command/Response Code field indicates the message type and the message meaning. Parameters of the Data Field are fixed length subfields and depend upon the message type. Detailed descriptions of the Command/Response Code field are shown below in Table I.

TABLE I

| Code | Command | Response | Meaning |
|------|---------|----------|---------|
| HE | ✓ | | HELLO. Conference Meister's Request for Session-Id |
| LO | | ✓ | LOGON. The Switch Interface's response to a Conference Meister's HE (Hello) assigning him his temporary Session-Id, and signaling him to logon. |
| LO | ✓ | | LOGON. A Conference Meister's logon. information giving user id, password, and account number in the data field. |
| RS | | ✓ | RESOURCES. The Switch Interface's acceptance of a Conference Meister's LO (Logon) |
| EC | ✓ | | ESTABLISH CONNECTION. A Conference Meister's request that a specified telephone number be connected to a conference. |
| SU | | ✓ | SUCCESS. The Switch Interface's response to an EC (Establish Connection) request. If successfully completed. It returns a connection-id used to refer to this members conference connection. |
| FA | | ✓ | FAIL. The reply sent when LO (Logon) or EC (Establish Connection) fails. Failure details are carried in the data field. |
| DC | ✓ | | DISCONNECT. A request from the Conference Meister to disconnect a conference members connection, or to terminate a conference (disconnect all member connections on the conference). |
| DC | | ✓ | DISCONNECT. An unsolicited response from the Switch Interface notifying the Conference Meister that a conference members connection has been disconnected. |
| ST | ✓ | | STATUS. This command is the Conference Meister's means of maintaining and reconstructing its conference information in the face of dropped connections and unreliable datagram transmissions. |
| ST | | ✓ | STATUS. The Switch Interface's reply to a Conference Meister's status request. |
| ER | | ✓ | ERROR. This is the reply used to signal invalid message parameters, such as Session-Id. |
| IH | ✓ | ✓ | I'M HERE. This message confirms that Conference Meister and Switch Interface are still in contact during intervals when there is no command/response traffic between them. |

In the above description of the invention, the Conference Meister 14 initiates the conference. By providing CDPU software to the other conferees, the invention allows any other one of the conferee stations, i.e. 10, 12, to serve as a Conference Meister.

Figure 4:
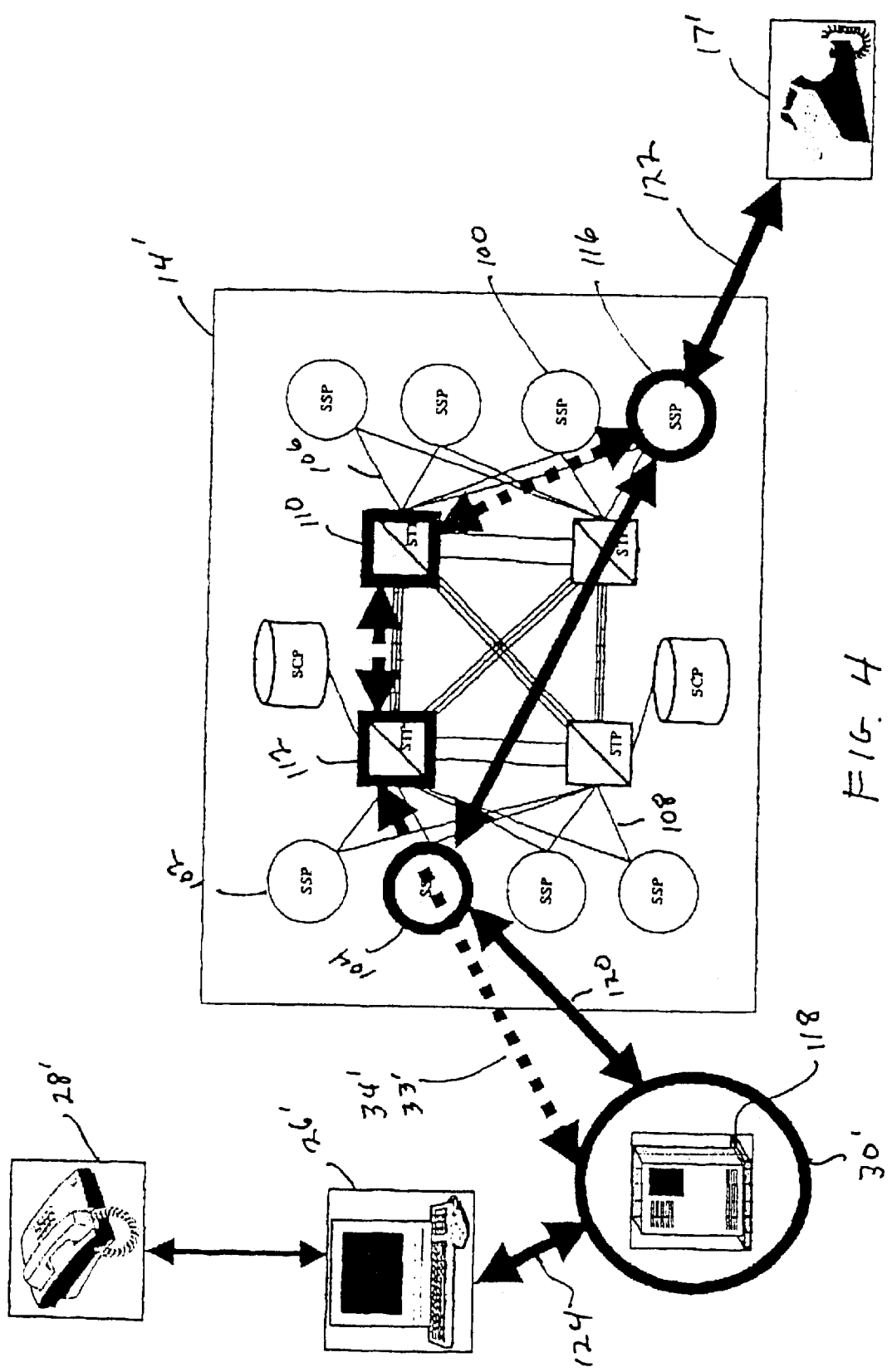
FIG. 4 is a block diagram of the invention showing the information of FIG. 1 in greater detail.

The functional interrelation of the elements of the system illustrated in FIG. 1 may be further understood by reference to FIG. 4. In FIG. 4, the abbreviations, used industry-wide, have the following meanings: SSP=Central Office (i.e. Service Signalling Point), SCP=Service Control Point, (it is an alternate SS7 entry point), and STP=Signal Transfer Point.

(In the drawings, different but related elements are identified with the same reference characters, albeit that corresponding elements in the various drawings are distinguished by primes.) The components of the telephone system are expanded in the box 14' showing one or more interconnected telephone central offices, e.g. 100, 104 that also contain control elements of the SS7 system, e.g. 110, 112. As one example of the interaction between the telephone system and the control disclosed in the present invention, a call placed by telephone 17' using conventional dialing enters the system through telephone central office 116. The call is internally routed, if necessary, by the SS7 control system over the telephone network to a telephone central office 104 which is connected to a telephone system/Internet interface, 33' and 34', that sends SS7 signals to an Internet computer 118 that a telephone call is in process and destined to the Internet 30'. (The dashed lines of FIG. 4 denote digital control functions; while the heavy black lines denote transmitted audio telephone signals as will be described below.) As is known in the art, within the Internet system are digital computers, e.g. 118, acting as routers, servers and capable of performing other digital manipulations. Hence, via the interface/switch control path 33', 34' the telephone central office advises the Internet computer 118, via the SS7/Internet control interface, that an audio signal is to be passed to the Internet. The telephone central office 104 transmits 120 the voice signals 122 originating at telephone 17', to the Internet computer 118 where it is digitized, if necessary, and packetized for transmission on the Internet. This switching and inter-node connecting of this entire process has taken place between the telephone system 14' and the Internet 30' under control of SS7 signals. Internet computer 118 converts or maps the SS7 command signals to TCP control signals that route and process the packets through the Internet, as disclosed above. The message 124 transits the Internet 30' to its destination, say, PC 28 of FIG. 1 where software decodes the audio message 124, rings the telephone 28, and provides an analog audio signal for telephone 28, corresponding to audio signal 122, generated at telephone instrument 17'.

In a second embodiment of the invention, the system of FIG. 1 may be further configured to provide an inherent call-back capability. Though it uses the same conferencing software described above, call-back can be between just two parties. Essentially each PC station is set up so it can serve as a "conference meister"; no other special software or hardware need be installed on a station's PC. Only the initiating station requires a PC or other access to the Internet. A suitably programmed touchtone phone can be used to access the Internet without the use of a computer such as the PC. The two party call-back feature sets up the call via the Internet with the conversation taking place on the normal telephone system in a manner substantially the same as that described above for conferencing.

Figure 2:
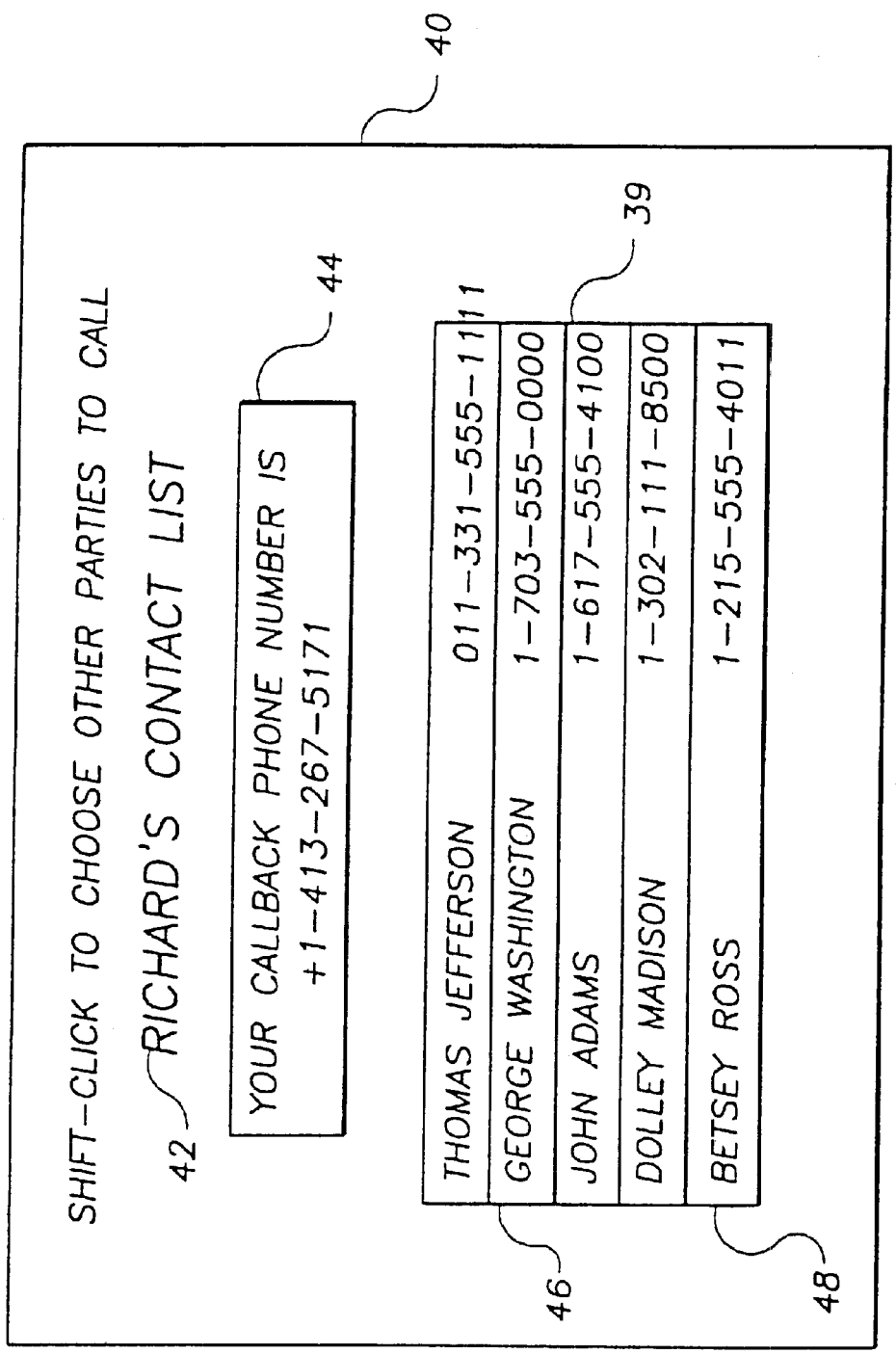
FIG. 2 is a drawing of a computer display according to the invention.

Referring to FIG. 2, a participating PC call-back station shows a display chart 40 on its monitor. The display chart 40 contains the station identification 42 (e.g. Richard) and a contact list 39, and the PC station's call-back telephone number 44. The contacts are shown with their complete dial-up telephone numbers, e.g. 46, 48, and by clicking on one or more or more of the displayed contacts, calls are dialed to the selected parties via the Internet and the switch 34 of FIG. 1, as previously described for conference calling. It will be appreciated that single parties can be selected to allow two person telephone conversation utilizing the convenience of simplified "point and click" dialing via the stored telephone numbers shown on the PC monitor screen. In the two party call-back connection system described above, it is not necessary to have two telephone lines at a PC station, i.e. one for connection to the Internet and one for carrying the telephonic conversation. With a single telephone line, the system software may be set to instantly disconnect the Internet connection after the called party's number is transmitted by the PC to the switch 34, and to ring the call initiator's telephone simultaneously. In this manner, the calling party and the called party are connected by means of a single telephone line in seconds.

Anonymity of the caller is preserved by the invention even when the calling party has automatic numbering identification (ANI) or "Caller ID". Since the system makes all its connections to the called party via the call-back technique from the remote switch 34 under control of the "conference meister" software, the only records of all the connected telephone numbers are recorded at the switch 34, including the number of the calling party. This occurs because the caller or "conference meister" is also one of the call-back numbers. Each connection is shown as a separate call on the inter-office telephone control (SS7) software originating from the switch 34, not from a calling party's telephone. The switch 34 can have an anonymous telephone number assigned as the originating number. Alternately, the calling party can designate some other listed number for ANI sending or Caller ID purposes which would key the called party as to who is calling.

With the anonymous option, no traceable record of a call is available locally. This minimizes industrial espionage at hotels, customer offices, and even private homes where merely the fact that certain parties made a call could be valuable information. The proper legal authorities can always get the full records from the central switch 34 if need be to document who initiated the call, and which telephones were called.

Figure 3:
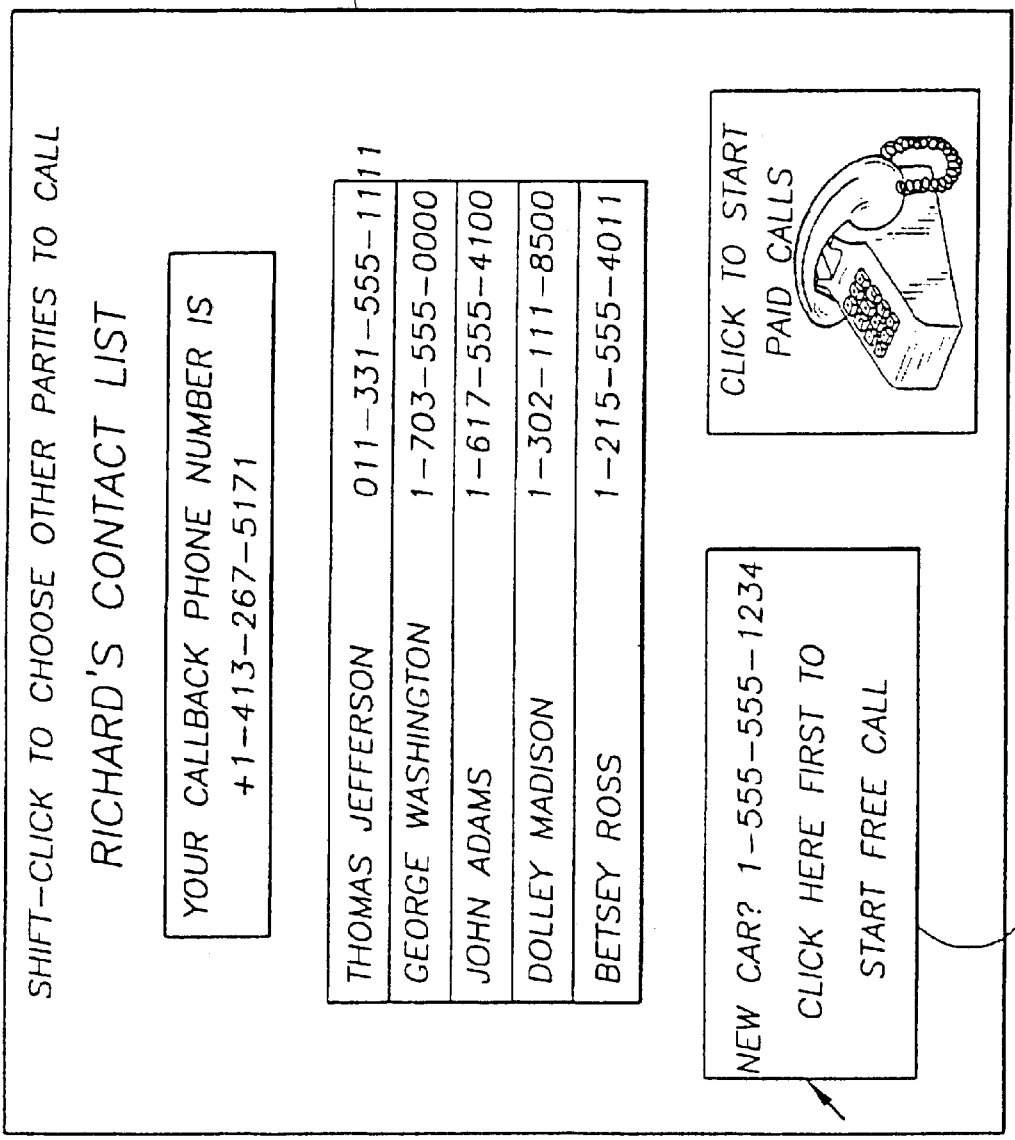
FIG. 3 is a drawing of a second embodiment of a computer display according to the invention.

In a third embodiment, the call-back system can be expanded to include an advertising feature. Referring to FIG. 3, a display 40' is expanded to include an advertising block 50. Under this embodiment, in order to place a call via the call-back system or activate a conference, the program requires clicking on the advertising block 50 by the caller to create a record that the advertisement was seen by the caller. Various subroutines can then be activated such as requiring additional periodic clicks on the advertisement to keep the call connected, or linking the caller to a web page of the advertiser providing additional information as to the users of the system.

It will be noted that the displays 40, 40' are to be implemented in various colors, and that the selection by clicking on any portion of the display will be highlighted in a manner known in the computer art.

The invention has been described in detail with particular reference to preferred embodiments thereof, but it will be understood that variations and modifications can be effected within the spirit and scope of the invention. For example, other data networks, such as a private intranet rather than the Internet, may be used for digital data communication among the conferee PCs, as well as other telephone signalling.

What is claimed is:

1. A system for controlling communication among a plurality of conferees, the system comprising:
   a digital computer for controlling and monitoring telephonic connections over an Internet Protocol (IP) communication network; and
   a switch interface in communication wit the digital computer over said IP communication network and further in communication wit a dial up communication network, wherein:
   the digital computer transmits digital control signals to the switch interface over the IF communication network;
   the switch interface transmits telephonic control signals to the dial up communication network in response to said digital control signals to establish at least one telephonic connection for a conference among the plurality of conferees; and
   the digital computer subsequently monitors the at least one telephonic connection over the IP communication network.

2. The system of claim 1, wherein the digital control signals include a telephone number associated with a conferee telephone device; and wherein the telephonic control signals cause the dial up communication network to dial up the conferee telephone devices based upon the telephone number.

3. The system of claim 1, wherein the dial up communication network is an SS7 compatible dial up communication network, and wherein the telephonic control signals are SS7 telephonic control signal.

4. The system of claim 1, wherein:
   the digital computer obtains connection status information from the switch interface over the IP communication network to monitor the at least one telephonic connection over the IP communication network.

5. The system of claim 4, wherein the switch interface uses telephonic control signals to obtain connection status information from the dial up communication system.

6. The system of claim 4, wherein:
   the digital computer transmits status request commands to the switch interface over the IP communication network to obtain the connection status information from the switch interface; and
   the switch interface transmits connection status information to the digital computer over the IP communication network in response to the status request commands.

7. The system of claim 4, wherein the switch interface transmits connection status information unsolicited to the digital computer over the IP communication network.

8. The system of claim 7, wherein the connection status information comprises:
   an indication that a telephonic connection associated with the conference has disconnected.

9. The system of claim 1, wherein:
   the digital computer transmits additional digital control signals to the switch interface to add a conferee to the conference; and
   the switch interface transmits additional telephonic control signals to the dial up communication network in response to said additional digital control signals to establish a telephonic connection for the added conferee.

10. The system of claim 1, wherein:
    the digital computer transmits additional digital control signals to the switch interface to remove a conferee from the conference; and
    the switch interface transmits additional telephonic control signals to the dial up communication network in response to said additional digital control signals to disconnect a telephonic connection for the removed conferee.

11. The system of claim 1, wherein the IP communication network is a public IP communication network.

12. The system of claim 11, wherein the public IP communication network is the Internet.

13. The system of claim 1, wherein the IP communication network is a private IP communication network.

14. The system of claim 1, wherein the digital computer is located at a conferee station.

15. The system of claim 1, wherein the digital computer is a personal computer.

16. The system of claim 1, wherein the digital computer is a controller, and wherein the switch interface is a gateway.

17. A method for controlling communication among a plurality of conferees, the method comprising:

transmitting digital control signals from a digital computer over an Internet Protocol (IP) communication network to a switch interface that transmits telephonic control signals to a dial up communication network in response to the digital control signals to establish at least one telephonic connection for a conference among the plurality of conferees; and monitoring the at least one telephonic connection byte digital computer over the IP communication network.

18. The method of claim 17 wherein the digital control signals include telephone numbers associated with the conferee telephone device, and wherein the telephonic control signals cause the dial up communication network to dial up the conferee telephone device based upon the telephone number.

19. The method of claim 17, wherein the dial up communication network is an SS7 compatible dial up communication network, and wherein the telephonic control signals are SS7 telephonic control signals.

20. The method of claim 17, wherein monitoring the at least one telephonic connection by the digital computer comprises:

obtaining connection status information by the digital computer from the switch interface over the IP communication network.

21. The method of claim 20, wherein the switch interface uses telephonic control signals to obtain connection status information from the dial up communication system.

22. The method of claim 20, wherein obtaining connection status information by the digital computer from the switch interface over the IP communication network comprises:

transmitting status request commands from the digital computer to the switch interface over the IP communication network; and receiving connection status information by the digital computer from the switch interface over the IP communication network in response to the status request commands.

23. The method of claim 20, wherein obtaining connection status information by the digital computer from the switch interface over the IP communication network comprises:

receiving unsolicited connection status information by the digital computer from the switch over the IP communication network.

24. The method of claim 23, wherein the connection status information comprises:

an indication that a telephonic connection associated with the conference has disconnected.

25. The method of claim 17, further comprising:

transmitting additional digital control signals from the digital computer over the IP communication network to the switch interface to add a conferee to the conference, said additional digital control signals causing the switch interface to transmit additional telephonic control signals to the dial up communication network to establish a telephonic connection for the added conferee.

26. The method of claim 17, further comprising:

transmitting additional digital control signals from the digital computer over the IP communication network to the switch interface to remove a conferee from the conference, said additional digital control signals causing the switch interface to transmit additional telephonic control signals to disconnect a telephonic connection for the removed conferee.

27. The method of claim 17, wherein the IP communication network is a public IP communication network.

28. The method of claim 27, wherein the public IP communication network is the Internet.

29. The method of claim 17, wherein the IP communication network is a private IP communication network.

30. The method of claim 17, wherein the digital computer is located at a conferee station.

31. The method of claim 17, wherein the digital computer is a personal computer.

32. The method of claim 17, wherein the digital computer is a controller, and wherein the switch interface is a gateway.

33. A method for controlling communication among a plurality of conferees, the method comprising:

receiving digital control signals over an Internet Protocol (IP) communication network;

transmitting telephonic control signals to a dial up communication network in response to the digital control signals to establish a telephonic connection to at least one conferee telephone devices for a conference among the plurality of conferees;

obtaining connection status information from the dial up communication network; and transmitting the connection status information over the IP communication network.

34. The method of claim 33, wherein the digital control signals include at least one telephone number associated with a conferee telephone device, and wherein the telephonic control signals cause the dial up communication network to dial up the conferee telephone devices based upon the telephone number.

35. The method of claim 33, wherein the dial up communication network is an SS7 compatible dial up communication network, and wherein the telephonic control signals are SS7 telephonic control signals.

36. The method of claim 33, wherein transmitting the connection status information over the IP communication network comprises:

receiving status request commands from a digital computer over the IP communication network; and transmitting the connection status information to the digital computer over the IP communication network in response to the status request commands.

37. The method of claim 33, wherein transmitting the connection status information over the IP communication network comprises:

transmitting the connection status information unsolicited to a digital computer over the IP communication network.

38. The method of claim 33, further comprising:

receiving additional digital control signals over the IP communication network requesting that a conferee be added to the conference; and transmitting additional telephonic control signals to the dial up communication network in response to the additional digital control signals to establish a telephonic connection for the added conferee.

39. The method of claim 33, further comprising:

receiving additional digital control signals over the IP communication network requesting that a conferee be removed from the conference; and transmitting additional telephonic control signals to the dial up communication network in response to the additional digital control signals to disconnect a telephonic connection for the removed conferee.

40. The method of claim 33, wherein the IP communication network is a public IP communication network.

41. The method of claim 40, wherein the public IP communication network is the Internet.

42. The method of claim 33, wherein the IP communication network is a private IP communication network.

43. The method of claim 33, wherein receiving digital control signals over an Internet Protocol (IP) communication network includes receiving digital control signals from a digital computer located at a conferee station over the Internet Protocol (IP) communication network and transmitting the connection status information over the IP communication network includes transmitting the connection status information to the digital computer over the IP communication network.

44. The method of claim 43 wherein the digital computer is a personal computer.

45. The method of claim 33, wherein receiving digital control signals over an Internet Protocol (IP) communication network includes receiving digital control signals from a controller over the Internet Protocol (IP) communication network and transmitting the connection status information over the IP communication network includes transmitting the connection status information to the controller over the IP communication network.

* * * * *

UNITED STATES PATENT AND TRADEMARK OFFICE
CERTIFICATE OF CORRECTION

PATENT NO. : 6,661,779 B2
DATED : December 9, 2003
INVENTOR(S) : Johnson Jr., et al.

It is certified that error appears in the above-identified patent and that said Letters Patent is hereby corrected as shown below:

Column 5,
Lines 64 and 66, "wit" should read -- with --.

Column 6,
Line 2, "IF" should read -- IP --.
Line 14, ";" should be replaced with -- , --.
Line 16, "devices" should read -- device --.

Column 7,
Line 18, "byte" should read -- by the --.
Line 21, "telephone numbers associated with the conferee telephone service" should read -- a telephone number associated with a conferee telephone device. --

Signed and Sealed this

Twenty-fourth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,661,779 B2
DATED : December 9, 2003
INVENTOR(S) : Johnson, Jr. et al.

It is certified that error appears in the above-identified patent and that said Letters Patent is hereby corrected as shown below:

Column 7,
Line 18, delete "byte" and insert -- by the --.

Signed and Sealed this

Second Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,661,779 B2
DATED : December 9, 2003
INVENTOR(S) : Johnson, Jr. et al.

It is certified that error appears in the above-identified patent and that said Letters Patent is hereby corrected as shown below:

Title page,
Item [63], Related U.S. Application Data, delete "6,480,074" and insert -- 6,480,474 --

Column 3,
Line 14, Table 1, delete "information" and insert -- Information --

Column 4,
Line 60, delete "one or more or more" and insert -- one or more --

Column 6,
Line 21, delete "signal" and insert -- signals --

Column 7,
Line 21, delete "telephone numbers associated with the conferee telephone device" and insert -- a telephone number associated with a conferee telephone device --
Line 38, delete "system" and insert -- network --

Column 8,
Lines 31 and 42, delete "devices" and insert -- device --

Signed and Sealed this

Twenty-sixth Day of July, 2005

JON W. DUDAS
*Director of the United States Patent and Trademark Office*